United States Patent
Ulrey et al.

(10) Patent No.: US 9,599,036 B2
(45) Date of Patent: Mar. 21, 2017

(54) METHOD AND SYSTEM FOR DIAGONAL BLOW-THROUGH EXHAUST GAS SCAVENGING

(71) Applicant: Ford Global Technologies, LLC, Dearborn, MI (US)

(72) Inventors: Joseph Norman Ulrey, Dearborn, MI (US); Brad Alan VanDerWege, Plymouth, MI (US); Brad Alan Boyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 14/448,971

(22) Filed: Jul. 31, 2014

(65) Prior Publication Data

US 2016/0032843 A1   Feb. 4, 2016

(51) Int. Cl.
| | | |
|---|---|---|
| F02F 1/42 | (2006.01) | |
| F02D 13/02 | (2006.01) | |
| F02B 31/08 | (2006.01) | |
| F02D 41/00 | (2006.01) | |

(52) U.S. Cl.
CPC ........ *F02D 13/0207* (2013.01); *F02B 31/085* (2013.01); *F02D 13/0257* (2013.01); *F02D 13/0261* (2013.01); *F02D 41/0007* (2013.01); *F02F 1/4214* (2013.01); *F01L 2800/06* (2013.01); *F02D 2041/001* (2013.01); *F02D 2200/0402* (2013.01); *F02D 2200/0802* (2013.01); *Y02T 10/144* (2013.01); *Y02T 10/18* (2013.01)

(58) Field of Classification Search
CPC .... F02F 1/4214; F02B 31/085; F01L 2800/06
USPC ............. 123/76, 90.15–90.18, 308, 315, 432
See application file for complete search history.

(56) References Cited

U.S. PATENT DOCUMENTS

| | | | |
|---|---|---|---|
| 4,616,605 A | | 10/1986 | Kline |
| 4,964,375 A | * | 10/1990 | Takeyama ............... F01L 1/185 123/315 |
| 6,595,183 B1 | | 7/2003 | Olofsson |
| 7,730,874 B2 | * | 6/2010 | Leduc ..................... F02B 17/00 123/432 |
| 8,365,528 B2 | | 2/2013 | Leone et al. |
| 8,671,898 B2 | * | 3/2014 | Brandt .................. F02B 25/145 123/315 |
| 2006/0272623 A1 | * | 12/2006 | Pagot ........................ F01L 1/26 123/559.1 |
| 2008/0308077 A1 | * | 12/2008 | Pagot ........................ F01L 1/18 123/559.1 |

OTHER PUBLICATIONS

Ulrey, Joseph N. et al., "Method to Improve Blowthrough via Split Exhaust," U.S. Appl. No. 14/157,167, filed Jan. 16, 2014, 46 pages.

* cited by examiner

*Primary Examiner* — Erick Solis
(74) *Attorney, Agent, or Firm* — Julia Voutyras; John D. Russell; B. Anna McCoy

(57) ABSTRACT

Methods and systems are provided for operating an engine in a two-valve diagonal blow-through mode during which a majority of blow-through is directed via a first intake valve positioned diagonally across a first exhaust valve in order to increase a distance of flow path from the intake valve to the exhaust valve.

17 Claims, 9 Drawing Sheets

TWO-VALVE DIAGONAL BLOW-THROUGH

FOUR-VALVE BLOW-THROUGH

TWO-VALVE DIAGONAL BLOW-THROUGH

MASKED TWO-VALVE BLOW-THROUGH

MASKED FOUR-VALVE BLOW-THROUGH

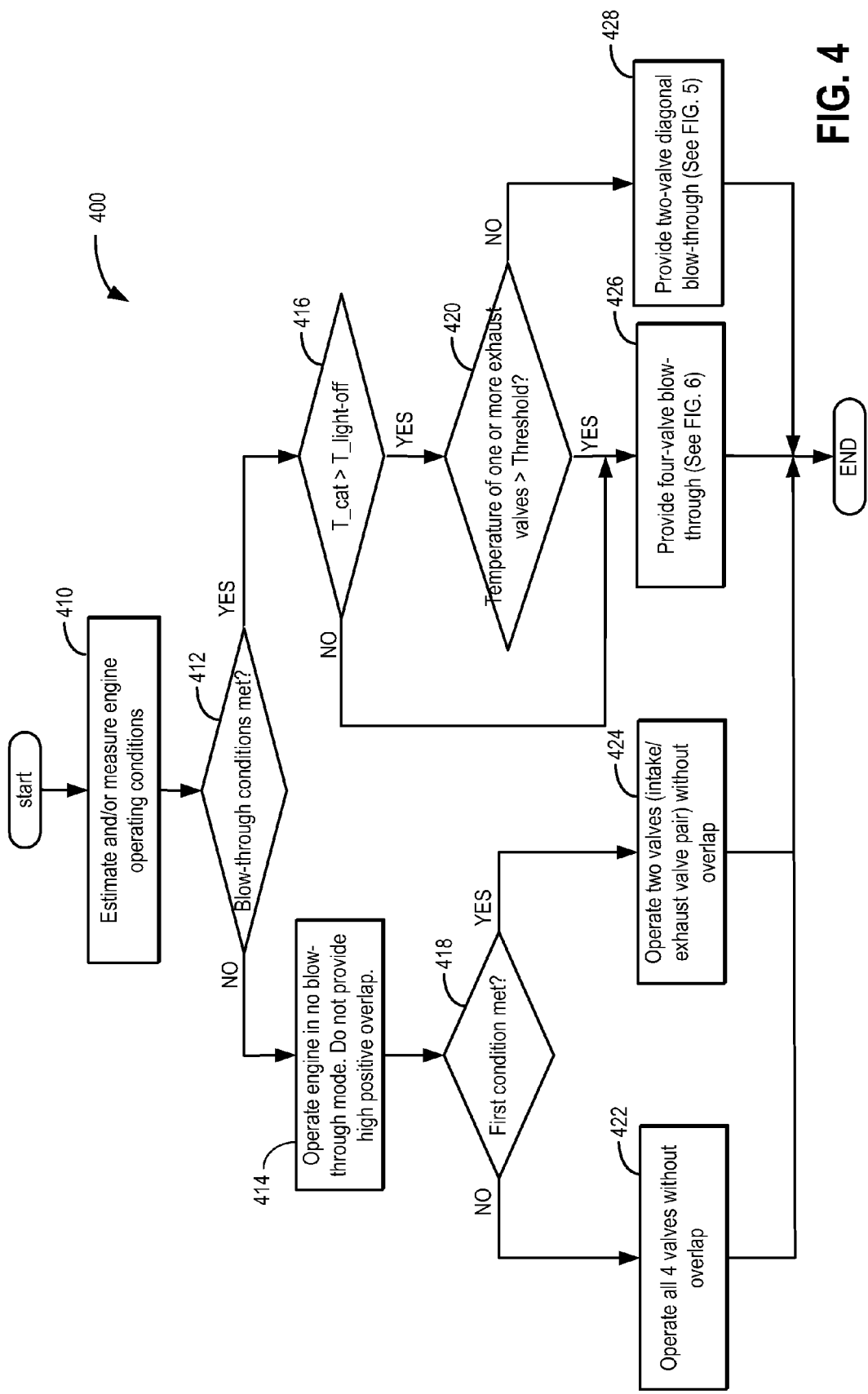

TWO-VALVE DIAGONAL BLOW-THROUGH

METHOD AND SYSTEM FOR DIAGONAL BLOW-THROUGH EXHAUST GAS SCAVENGING

FIELD

The present description relates generally to methods and systems for improving torque output with blow-through air in a boosted internal combustion engine.

BACKGROUND/SUMMARY

Performance of an engine can be enhanced via a turbocharger or a supercharger. The turbocharger or supercharger pressurizes ambient air to increase the density of air entering engine cylinders. The cylinder trapped air amount is increased as the cylinder charge may be denser than that of a non-turbocharged engine. This may allow increased amount of fuel injected to be into the engine cylinder compared to a non-turbocharged engine, hence result in increased torque.

However, during certain conditions (e.g., at low engine speeds and full throttle); boosted engines may be severely knock-limited resulting in reduced torque output. One approach to improve low speed knock-limited torque includes providing variable intake and/or exhaust valve timing. In particular, intake and exhaust valves of a turbocharged engine may be adjusted such that engine output power may be increased when intake and exhaust valves of a cylinder are simultaneously open and when engine intake manifold pressure is higher than engine exhaust manifold pressure. Pressurized air in the engine intake manifold can drive exhaust gases from the cylinder to the engine exhaust manifold so that cylinder fresh charge (e.g. air and fuel) may be increased. Further, by replacing the trapped exhaust gas with fresh air, charge temperatures may be reduced. Consequently, tendency for knock may be reduced.

However, the inventors herein have identified issues with such an approach. As an example, during the overlap period, due to short flow path between the intake and the exhaust valves, the air delivered by the compressor may leak into the exhaust ports before the exhaust gases are completely purged from the cylinder. Consequently, an increased amount of boosted air may be required to purge the chamber of exhaust gases, which may limit an amount of boost that can be provided by the compressor.

Further, in order to maintain a stoichiometric exhaust air-to-fuel ratio, additional fuel may be injected into the cylinder to compensate for the additional air in the exhaust. As a result, exhaust gases may contain high carbon monoxide and hydrogen concentrations, which may combine exothermically with excess oxygen in the additional air, which when oxidized at the catalyst may result in catalyst over temperature conditions.

In one example, the above issues may be at least partly addressed by a method for an engine including one or more four-valve cylinder, comprising: during a first positive valve overlap mode, flowing more blow-through from an intake manifold to an exhaust manifold through a first intake valve and a first exhaust valve than through a second intake valve and a second exhaust valve of the cylinder.

As an example, during engine operation in the first overlap mode, compressed air may be directed from the intake manifold via the first intake valve and hot residual gas may be purged via the first exhaust valve. The first intake valve and the first exhaust valve may be positioned diagonally in a cylinder head. Consequently, during the blow-through, gas may flow through a longer diagonal path.

In this way, by directing the gases to flow through a longer path, exhaust gases may be purged more effectively from the cylinder, and more fresh air may be trapped in the cylinder. The resulting increased cylinder air charge may provide more torque. The increased torque output at low engine speeds may increase time in top gear resulting in improved fuel economy. Further, due to more air being trapped in the cylinder, an amount of air leaking to the exhaust may be reduced. Consequently, cylinder may be operated less rich. The decreased amount of air in the exhaust and the less rich combustion may reduce the amount of fuel and air combining exothermically in the exhaust manifold. As a result, excess increase in exhaust gas temperatures and therefore, excess increase in exhaust catalyst temperatures may be reduced.

Further, as a result of the exhaust gases being effectively purged, an in-cylinder temperature may be reduced. Consequently, the lower in-cylinder temperature may reduce the tendency for knock, which may allow the engine to be operated with more spark advance, which may also contribute to reducing the exhaust temperature.

Taken together, by providing diagonal blow-through, more torque may be available at low speed, fuel economy may be improved, excess heating of exhaust catalyst may be reduced, and reduced incidence of knock may be achieved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 4 shows an example flow chart illustrating a routine for determining a type of blow-through depending on engine operating conditions.

FIG. 5 shows an example flow chart illustrating a routine for providing a two-valve diagonal blow-through.

FIG. 6 shows an example flow chart illustrating a routine for providing a four-valve blow-through.

FIG. 7 shows an example graph depicting example valve timings, valve lifts, and durations during two-valve diagonal blow through.

FIG. 8 shows an example graph depicting example valve timings, valve lifts, and durations during four-valve blow through.

DETAILED DESCRIPTION

Figure 1:
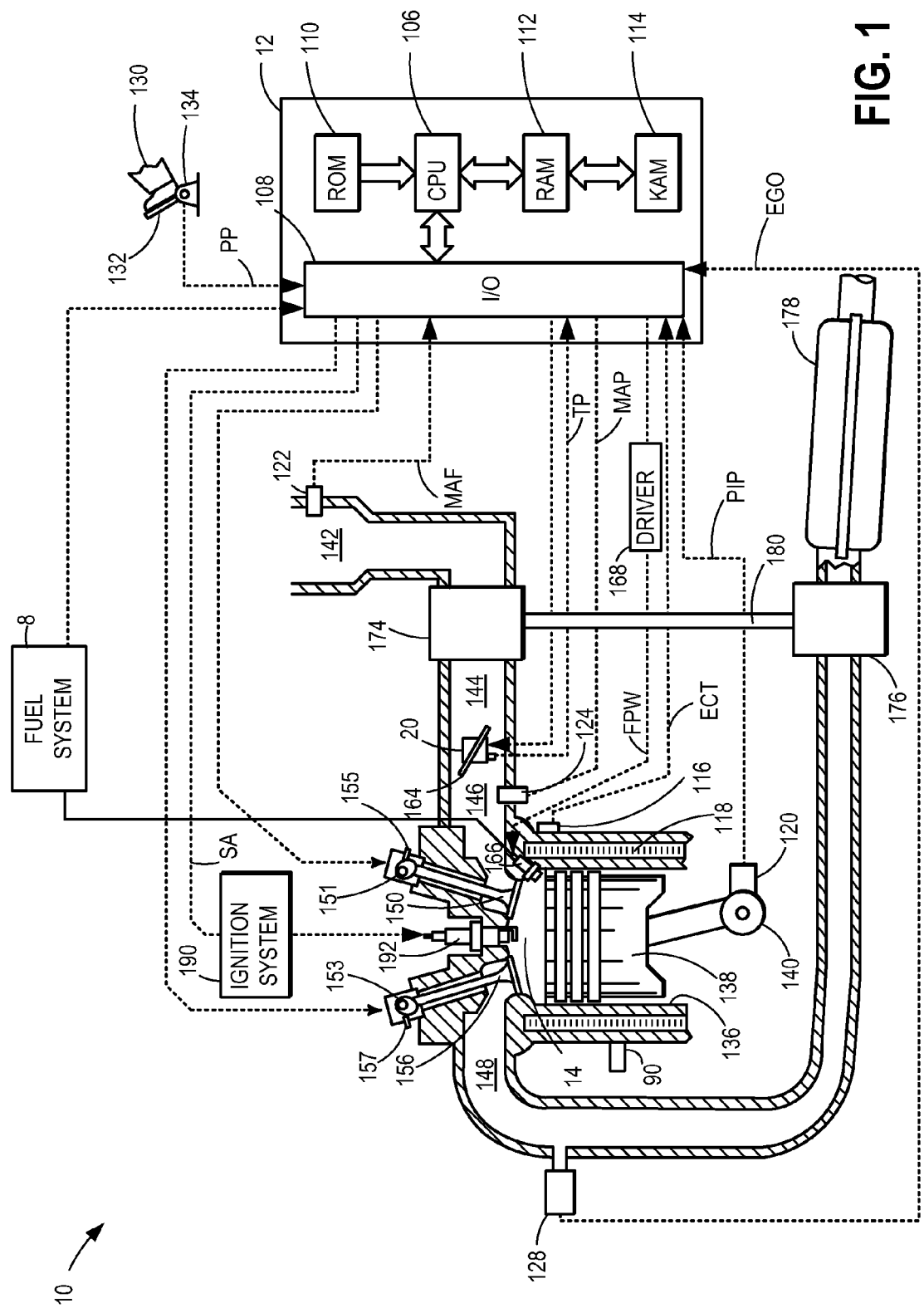
FIG. 1 shows a schematic diagram of one cylinder of an example engine system.
Figure 2:
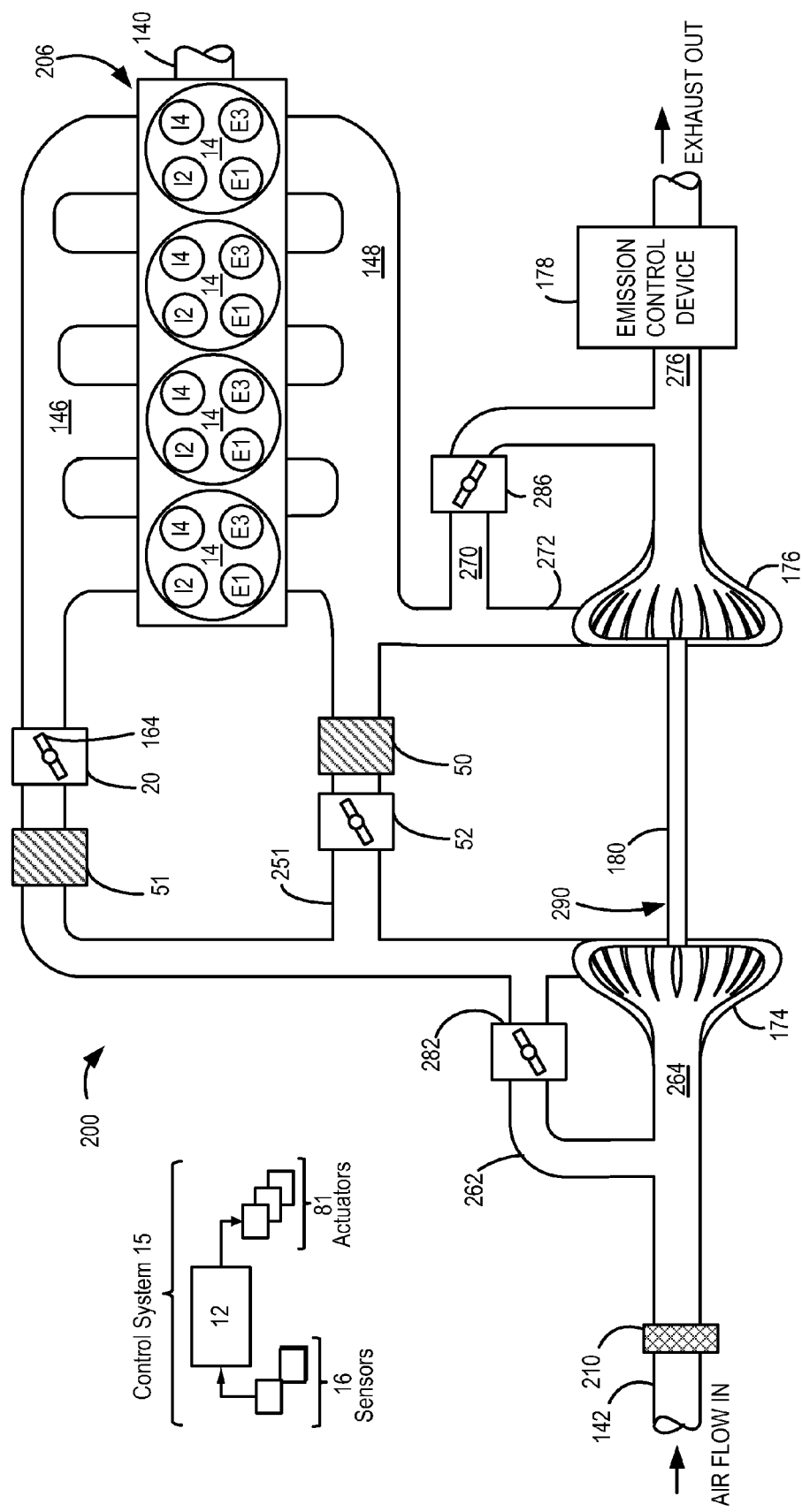
FIG. 2 shows a schematic depiction of an example engine system of a 4-cylinder engine including a turbocharger.
Figure 3A:
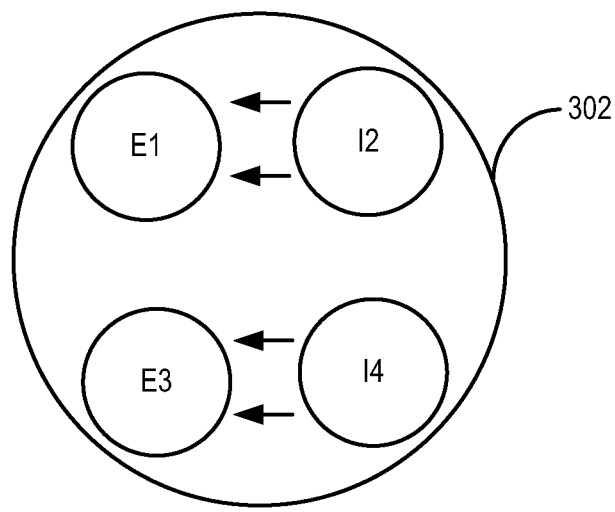
FIGS. 3A, 3B, 3C, and 3D show an example four-valve cylinder head including direction of flow of gas during a four-valve blow-through, a two-valve diagonal blow-through, a masked two-valve blow-through, and a masked four-valve blow-through respectively.
Figure 3B:
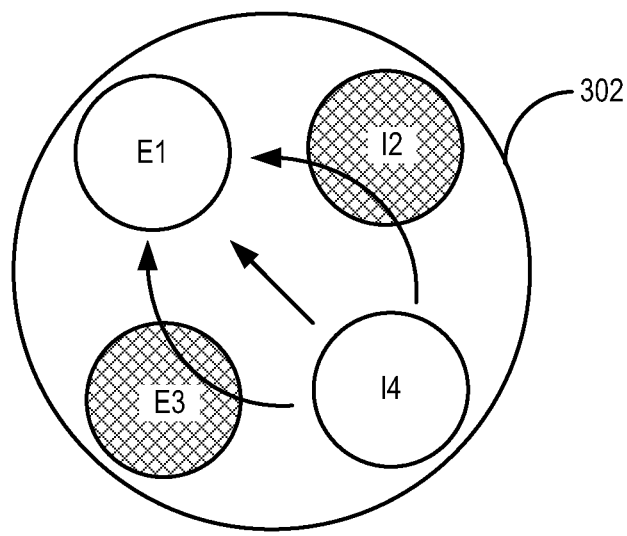
Figure 3C:
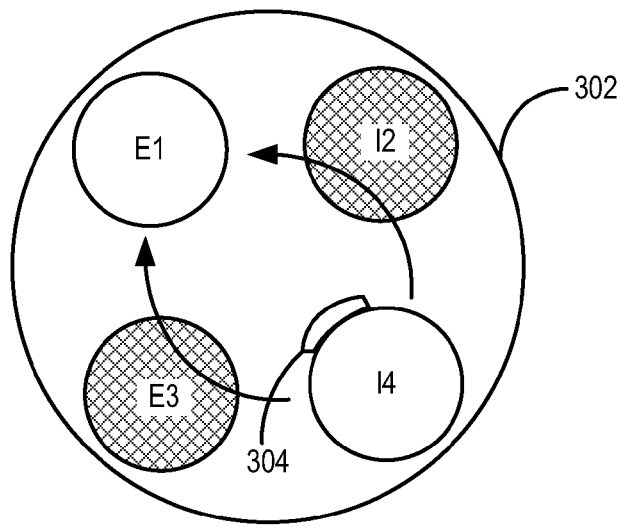
Figure 3D:
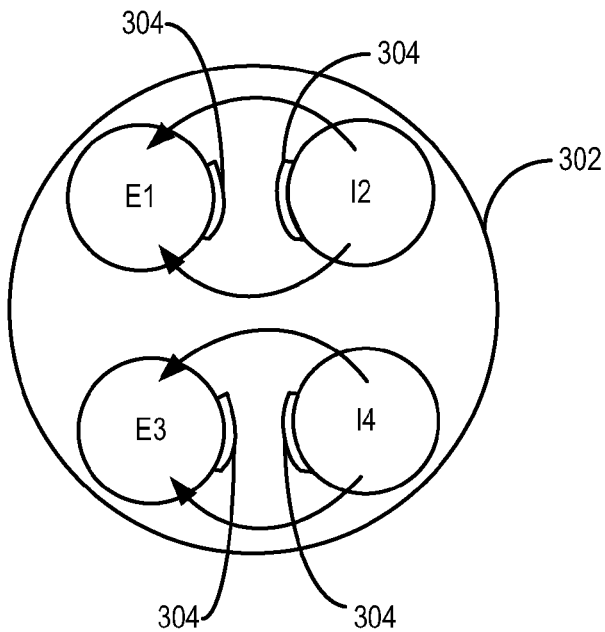
Figure 7:
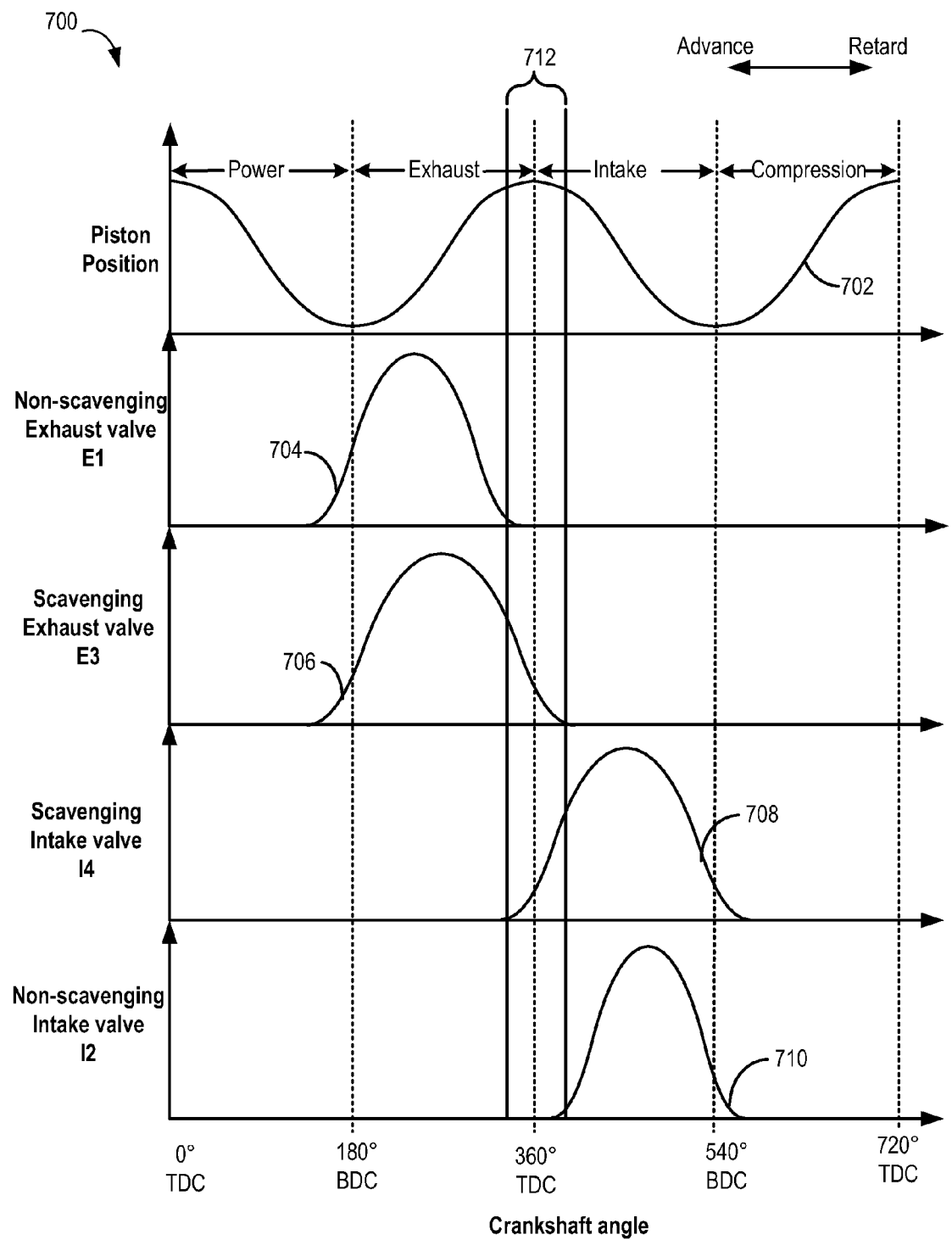
Figure 8:
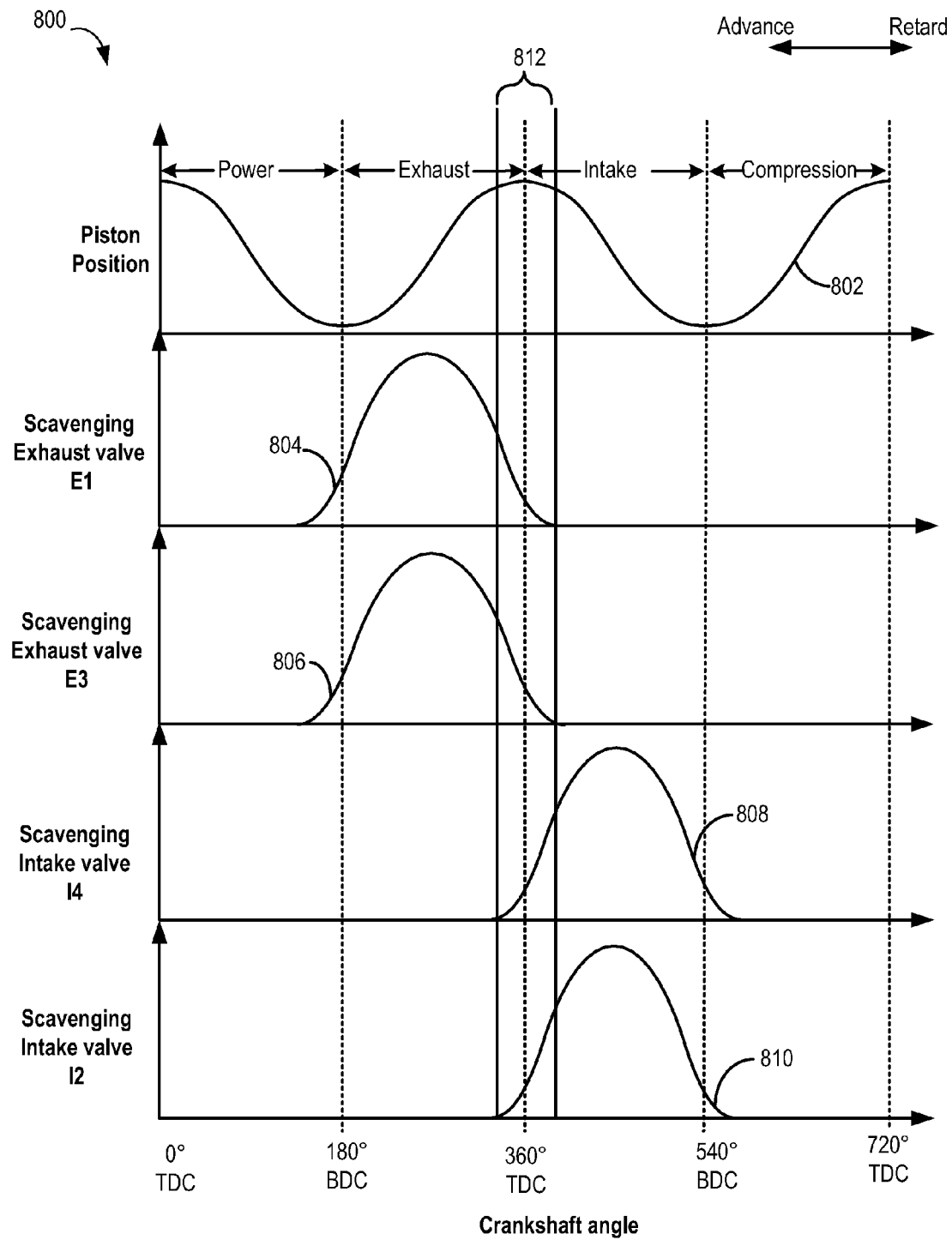

The present description relates to methods and systems for improving blow-through scavenging in an engine system including a turbocharger as depicted in FIGS. 1-2. An engine controller may be configured to perform control routines, such as those depicted in FIGS. 4-6. to determine a type of blow-through (two-valve diagonal blow-through or four-valve blow-through) and operate the engine in the determined blow-through mode. The two-valve diagonal blow through mode, as illustrated at FIG. 3B, may be utilized to increase a distance of flow of gases from a first intake valve to a first exhaust valve, thereby improve mixing of the gases for more efficient purging and increase the cylinder air charge by reducing an amount of blow-through air leaking into an exhaust manifold. The four-valve blow-through mode, as illustrated at FIG. 3A, may be utilized instead of the two-valve blow-through mode when a temperature of one or more valves is greater than a threshold degradation temperature to reduce degradation of the valves utilized for blow-through. In one example, the four-valve blow through mode may be utilized to expedite heating of an exhaust catalyst coupled to the engine of FIGS. 1-2. In some examples, a masked two-valve blow-through mode as shown at FIG. 3C may be utilized. In some other examples, a masked four valve blow-through mode as shown at FIG. 3D may be utilized. Example valve timings, valve durations, and valve lifts during the two-valve diagonal blow-through mode and during the four-valve blow-through mode are shown at FIGS. 7 and 8 respectively.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown herein, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 10 may further include a knock sensor 90 coupled to each cylinder 14 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder Controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from knock sensor 90 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. Example routines are shown with reference to FIGS. 4-6.

It will be appreciated that while the present example is described with reference to a boosted engine having blow-through capabilities, the adjusting of engine operating parameters such as fuel richness values, blow-through thresholds, temperature thresholds, etc., may be calibrated in other embodiments so that it works optimally for a particular engine, powertrain, and/or vehicle combination.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 156 closes and intake valve 150 opens. Air is introduced into combustion chamber 14 via intake manifold 146, and piston 138 moves to the bottom of the cylinder so as to increase the volume within combustion chamber 14. The position at which piston 138 is near the bottom of the cylinder and at the end of its stroke (e.g. when combustion chamber 14 is at its largest volume) is typically referred to by those of skill in the art as bottom dead center (BDC). During the compression stroke, intake valve 150 and exhaust valve 156 are closed. Piston 138 moves toward the cylinder head so as to compress the air within combustion chamber 14. The point at which piston 138 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 192, resulting in combustion. During the expansion stroke, the expanding gases push piston 138 back to BDC. Crankshaft 40 converts piston movement into a rotational torque of the rotary shaft. Finally, during the exhaust stroke, the exhaust valve 156 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Based on the timing differences between exhaust valve closing and intake valve opening, the valves may be operated with negative valve overlap wherein for a short duration after the end of the exhaust stroke and before the commencement of the intake stroke, both intake and exhaust valves are closed. This period, during which both valves are closed, is referred to as negative (intake to exhaust) valve overlap. In one example, the VCT system may be adjusted so that the negative intake to exhaust valve overlap timing may be a default cam position of the engine during cylinder combustion.

Alternatively, the valves may be operated with positive valve overlap wherein for a short duration before the end of the exhaust stroke and after the commencement of the intake stroke, both intake and exhaust valves may be open. This period, during which both valves may be open, is referred to as a positive (intake to exhaust) valve overlap. The VCT system may be adjusted so that an amount of positive valve overlap during selected boosted engine operating conditions to increase positive valve overlap. Specifically, a position of the intake camshaft may be adjusted such that an opening of the intake valve timing is advanced. Consequently, the intake valve may be opened earlier before the end of the exhaust stroke and a duration over which both valves are open may be increased, leading to more positive valve overlap. As one example, positive valve overlap may be increased by moving the intake camshaft from a position of some positive valve overlap to a position having more positive valve overlap. As another example, positive valve overlap may be increased by moving the intake camshaft from a position of negative valve overlap to a position of positive valve overlap. In one example, the VCT system may be adjusted so that the negative intake to exhaust valve overlap timing may be a default cam position of the engine during an engine cold-start.

It will be appreciated that while the above example suggests increasing positive valve overlap by advancing intake opening timing, in alternate examples, positive valve overlap may be increased by adjusting an exhaust camshaft to retard exhaust valve closing. Further still, each of the intake and the exhaust camshafts may be adjusted to vary the positive valve overlap by varying both the intake and the exhaust valve timings.

In engine system 10, during periods of rapidly increasing engine load, such as immediately after start-up, upon tip-in, or upon exiting DFSO, the amount of intake air compression provided by the compressor may be inadequate. During at least some of these conditions, the amount of boost pressure available from the compressor may be limited due to the turbine not being spun up to a sufficiently high rotational speed (for example, due to low exhaust temperature or pressure). As such, the time required for the turbine to spin up and drive the compressor to provide the required amount of compressed intake air is referred to as turbo lag. During turbo-lag, the amount of torque provided may not match the torque demand, leading to a drop in engine performance.

To expedite turbine spin-up and reduce turbo lag, the engine may be operated in a blow-through mode during those conditions. Therein, an amount of compressed intake air, herein also referred to as blow-through air, may be directed from the intake manifold to the exhaust manifold, while maintaining stoichiometric cylinder combustion, to provide extra mass flow for spinning up the turbine. In some embodiments, a fuel injection may be adjusted (e.g., enriched) commensurate with the blow-through air amount to provide extra enthalpy for spinning up the turbine. The blow-through air may be provided while the engine has at least some boost, that is, while an intake manifold pressure (MAP) is higher than the exhaust manifold pressure by at least a threshold amount. Based on engine operating conditions prevalent at the time blow-through air is requested, an amount of valve overlap is adjusted so that the required amount of blow-through air can be provided to the turbine via the engine cylinders through positive valve overlap.

For example, to provide the blow-through via the engine cylinders, the VCT system may be adjusted from an initial position having no positive valve overlap to a final position having increased positive valve overlap. In one example, the final position may be position of full valve overlap (or maximum positive valve overlap). While the methods herein discuss providing blow-through air always via positive valve overlap, in alternate embodiments, blow-through air may be provided via positive valve overlap only if the valve timing for providing positive valve overlap does not degrade engine fuel economy, combustion stability, and torque output.

As discussed below, during a first blow-through condition, such as during a tip-in amount greater than a threshold amount, an indication of knock, and at low-speed high torque demand operations, when a first exhaust valve temperature is less than a threshold degradation temperature, the engine may be operated in a two-valve diagonal blow-through mode, wherein a duration positive overlap between the first intake and the first exhaust valve may be greater than a duration of positive overlap between the second intake valve and the second exhaust valve such that a majority of boosted intake air may be directed via the first intake valve to purge hot residua gases via the first exhaust valve. The first intake valve may be positioned diagonally across the first exhaust valve in the cylinder head.

In this way, by diagonally directing the blow-through air via diagonal intake and exhaust valves, a distance of flow path of gases from the intake valve to the exhaust valve may be increased resulting in reduced leaking of blow-through air to the exhaust. That is, by increasing the distance of flow path, residual gases in the cylinder may be more efficiently purged, and more blow-through air may be trapped in the clearance volume of the cylinder. As a result, torque output may be increased (due to increased cylinder air charge resulting from increased amount of trapped air). Due to increased purging efficiency, in-cylinder temperature may be reduced, decreasing the tendency for knock. Still further, due to reduced blow-through air in the exhaust, the cylinder may be operated less rich. The less rich combustion and decreased air in the exhaust may result in reduced exhaust gas temperature, and therefore, excess increase in exhaust catalyst temperature may be reduced. As a result, catalyst degradation may be reduced and the amount of blow-through that may be utilized (that may be otherwise limited by excess catalyst temperature) may be increased.

However, during some operating conditions, it may be desirable to increase the temperature of the exhaust catalyst, such as during a cold start when the exhaust catalyst temperature is less than the activation temperature. During these conditions, the four-valve blow-through may be employed, where in all four valves may be operated with positive overlap to direct boosted air from the intake manifold to the exhaust manifold, and the cylinder may be operated more rich (compared to the two-valve blow through). The products of rich combustion may combine exothermically with blow-through air in the exhaust increasing exhaust temperature. Consequently, catalyst temperature may be increased, thereby expediting heating of the exhaust catalyst.

Further, during some other conditions, when the two-valve blow-through mode is employed, due to majority of blow-through performed through only one set of diagonal valves, the temperature of the valves participating in the two-valve blow-through may increase above the threshold degradation temperature above which degradation of the valves may occur. Therefore, when a temperature of one or more valves increases above the threshold, the controller may switch engine operation to the four-valve blow-through mode in order to reduce thermal load on the valves.

Details of the two-valve blow-through mode and the four-valve blow-through mode will be further elaborated with respect to FIGS. 3-7.

In some examples, a mask may be provided to either the intake valve and/or the exhaust valve utilized for the two-valve blow through so as to block the shortest path from the intake valve to the exhaust valve. The blow-through gases may be directed above and/or around the mask such that the distance of flow path is further increased (with respect to the two-valve mode without mask). Further the mask may improve a mixing of gases, which may reduce the in-cylinder temperatures, thereby reducing tendency for knock. Details of the masked two-valve blow through will be further elaborated with respect to FIG. 3C.

In some other examples, a mask may be provided one or more valves utilized for the four-valve blow-through. As discussed above, the blow-through air directed around the mask may improve mixing and reduce in-cylinder temperatures. Details of the masked two-valve blow through will be further elaborated with respect to FIG. 3D.

FIG. 2 shows an example embodiment of an engine system 200, which may include engine 10, including controller 12, a turbocharger 290 and an engine block 206 with a plurality of cylinders 14. Engine system 200 is shown having an intake manifold 146 configured to supply intake air and/or fuel to the cylinders 14 and an exhaust manifold 148 configured to exhaust the combustion products from the cylinders 14. Ambient air flow can enter the intake system through intake air passage 142 and air filter 210. A throttle 20 including a throttle plate 164 may be provided along an intake passage of the engine for varying the flow rate and/or pressure of intake air provided to the engine cylinders. Accordingly, throttle position may be utilized as an engine operating parameter for controlling air flow in the engine. For example, throttle 20 may be disposed downstream of compressor 174 as shown herein, or alternatively may be provided upstream of compressor 174.

The turbocharger 290 includes a compressor 174, which may be coupled to a turbine 176 by shaft 180 thereby powering the compressor. The coupled turbine 176 and compressor 174 of the turbocharger 290 may rotate at a speed which may increase or decrease with operation of the turbocharger. The turbocharger speed may be an engine operating parameter for controlling boost to the cylinders 14. Compressor 174 is further shown arranged in compressor passage 264. Parallel to the compressor passage 264 is bypass passage 262 and compressor bypass throttle 282.

Thus, the amount of intake air bypassing the compressor can be controlled by adjusting the compressor bypass throttle 282. Further, in some embodiments, compressor bypass throttle 282 may also function as a surge valve configured to allow air to flow around the compressor when the compressor causes an undesired restriction of the intake air, such as may occur at higher engine loads.

The compressor passage 264 and compressor bypass passage 262 are further shown recombining into intake manifold 146. Air compressed in the compressor 174 may communicate fluidly with one or more of the cylinders 14 via intake manifold 146. The turbocharger 290 may be configured to increase a mass of air entering at least one of the cylinders 14. In this way, the turbocharger 290 may control, at least in part, an amount of air flow in the engine 200. Air and exhaust flow in and out of the cylinders 14 may be controlled with cylinder intake valves I2, I4 and exhaust valves E1, E3, discussed in more detail below.

Exhaust manifold 148 is shown fluidly communicating with turbine passage 272 via exhaust gas inlet 274 to enable exhaust gases to flow to turbine 176. Turbine passage 272 may be a single exhaust passage for an entire path that exhaust air may take from an exhaust gas inlet, to the turbine 176. The turbine passage 272 enables a single mixed exhaust gas to enter the turbine 176 from the exhaust manifold 148. In other examples, the turbocharger may include more than one turbine passage from the exhaust gas inlet to the turbine (i.e., the turbocharger may be a twin scroll turbocharger). In such examples additional fuel enrichment may be needed for exhaust temperature control and premium materials may be needed in turbocharger elements and components (for example a turbine housing flange). In examples with a single turbine passage (such as that shown in FIG. 2) additional fuel enrichment and premium materials may not be needed. Further, in some embodiments, turbine 176 may be a variable geometry turbine. In parallel with the turbine passage is turbine bypass passage 270 and waste gate 286. The amount of exhaust gas bypassing the turbine may be controlled by adjusting waste gate 286. Finally, turbine passage 272 and turbine bypass passage 270 are shown recombining to form exhaust passage 276 prior to exhausting to ambient.

In some embodiments, the intake and/or exhaust system may further include one or more sensors configured to measure temperature and pressure at various locations. For example, an ambient air temperature sensor and pressure sensor may be arranged near the entrance of intake passage 142. Likewise, sensors may be arranged along the intake passage before and/or after the compressor, and/or within the intake manifold near the entrance to the combustion cylinder(s), among other locations. Each of these sensors may be configured to communicate via signal lines with controller 12. In this manner, feedback control of the temperature and pressure of the intake air and exhaust air may be maintained by the various control mechanisms described herein.

Depending on operating conditions, a portion of exhaust may be recirculated from the exhaust manifold 148, upstream of turbine 176, to intake manifold 146, downstream of compressor 174 via EGR passage 251. An EGR cooler 50 and an EGR valve 52 may be coupled in EGR passage 251. In this manner, high pressure exhaust gas recirculation (HP-EGR) may be enabled. In some embodiments, in addition to the HP-EGR, low pressure exhaust gas recirculation (LP-EGR) may also be enabled wherein a portion of treated exhaust is recirculated from the exhaust manifold 148, downstream of turbine 176, to intake manifold 146, upstream of compressor 174 via a low pressure EGR passage and therein coupled EGR cooler and EGR valve (not shown).

Continuing with FIG. 2, engine block 206 includes crankshaft 140 and cylinders 14. Cylinders 14 may each include a spark plug and a fuel injector for delivering fuel directly to the combustion chamber, as described above in FIG. 1. However, in alternate embodiments, each cylinder 14 may not include a spark plug and/or direct fuel injector. Cylinders 14 may each be serviced by one or more valves. In the present example, cylinders 14 each include intake valves 12 and 14, and exhaust valves E1 and E3.

Intake valves I2 and I4 may be actuatable between an open position allowing intake air into a first cylinder of the cylinders 14 and a closed position substantially blocking intake air from the first cylinder. Further the intake valves may be actuated by a common intake camshaft (not shown) included in an intake valve actuation systems (not shown). Exhaust valves E1 and E3 may be actuatable between an open position allowing exhaust gas out of the first cylinder of the cylinders 14 and a closed position substantially retaining gas within the first cylinder. Intake valve actuation systems and exhaust valve actuation systems (not shown) may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 14 may each have more than one exhaust valve and/or intake valve. In still other examples, the exhaust valves and the intake valves may be actuated by a common camshaft. However, in an alternate embodiment, at least one of the intake valves and/or exhaust valves may be actuated by its own independent camshaft or other device.

Engine 200 may include variable valve timing systems, for example a CPS system, and a variable cam timing VCT system. A variable valve timing system may be configured to open a first valve for a first duration during a first operating mode. The first operating mode may occur at an engine load below a part engine load threshold. Further, the variable valve timing system may be configured to open the first valve for a second duration, shorter than the first duration, during a second operating mode. The second operating mode may occur at an engine load above an engine load threshold and an engine speed below an engine speed threshold (e.g., during low to mid engine speeds). In some examples, the engine load threshold of the second operating mode may be the same as the part engine load threshold of the first operating mode. In other examples, the engine load threshold of the second operating mode is not the same as the part engine load threshold of the first operating mode.

The CPS system may be configured to translate the intake camshaft longitudinally, thereby causing operation of intake valves to vary between first intake cams and second intake cams. Further, the CPS system may be configured to translate an exhaust camshaft longitudinally, thereby causing operation of the exhaust valves to vary between first exhaust cams and second exhaust cams. In this way, CPS system may switch between a first cam, for opening a valve for a first duration, and a second cam, for opening the valve for a second duration.

Further, the CPS system may be configured to actuate the intake valves with the first intake cams and actuate the exhaust valves with the first exhaust cams during a first operating mode that occurs at an engine load below a part engine load threshold. Further still, the CPS system may be configured to actuate the intake valves with the second intake cams and actuate the exhaust valves with the second exhaust cams during a second operating mode that occurs at an engine load above an engine load threshold and at an engine speed below an engine speed threshold.

Also, the CPS system may be operated in response to engine operating parameters and conditions. For example, transient airflow differences, such as between the intake manifold 146 and the cylinders 14 may lead to selecting a particular speed or speed range for the CPS system to switch a camshaft between first cams and second cams. Further, the CPS system may operate at least one of an exhaust valve, and an intake valve of a first cylinder and a second valve of a second cylinder with a short cam duration to inhibit an exhaust blowdown of the first cylinder from entering the second cylinder.

The configuration of cams described above may be used to provide control of the amount of air supplied to, and exhausted from, the cylinders 14. However, other configurations may be used to enable the CPS system to switch valve control between two or more cams. For example, a switchable tappet or rocker arm may be used for varying valve control between two or more cams.

Engine 200 may further include a VCT system (not shown). The VCT system may be a twin independent variable camshaft timing system, for changing intake valve timing and exhaust valve timing independently of each other. The VCT system includes an intake camshaft phaser and an exhaust camshaft phaser for changing valve timing. The VCT system may be configured to advance or retard valve timing by advancing or retarding cam timing (an example engine operating parameter) and may be controlled via signal lines by controller 12. The VCT system may be configured to vary the timing of valve opening and closing events by varying the relationship between the crankshaft position and the camshaft position. For example, the VCT system may be configured to rotate intake camshaft and/or exhaust camshaft independently of the crankshaft to cause the valve timing to be advanced or retarded. In some embodiments, the VCT system may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. Signal lines can send control signals to and receive a cam timing and/or cam selection measurement from the CPS system and VCT system.

As described above, FIG. 2 shows a non-limiting example of an internal combustion engine and associated intake and exhaust systems. It should be understood that in some embodiments, the engine may have more or less combustion cylinders, control valves, throttles, and compression devices, among others. Example engines may have cylinders arranged in a "V" configuration. Further, a first camshaft may control the intake valves for a first group or bank of cylinders and a second camshaft may control the intake valves for a second group of cylinders. In this manner, a single CPS system and/or VCT system may be used to control valve operation of a group of cylinders, or separate CPS and/or VCT systems may be used. Further still, in some embodiments, the engine system 200 may include a battery and a turbo driver, controlled by controller 12, for electronically powering the compressor 174. Further still, in some embodiments, turbocharger 290 may alternatively be a supercharger or other compression device.

Turning to FIG. 3A, it shows an example four-valve cylinder head including two intake and two exhaust valves during a four-valve blow-through condition. Four-valve blow-through may be achieved by providing positive overlap between intake and exhaust valves such that boosted air may be directed from a first intake valve (e.g. intake valve I2) and a second intake valve (e.g., intake valve I4) into the cylinder to purge residual gas, which may exit the cylinder via a first exhaust valve (e.g., exhaust valve E1) and a second exhaust valve (e.g. exhaust valve E3). As such, four-valve blow-through may be provided during cold start conditions to expedite heating of the exhaust catalyst when an exhaust catalyst temperature is less than a catalyst light-off temperature. In some examples, the four-valve blow-through may be provided when a temperature of one or more intake and/or exhaust valve is greater than a threshold degradation temperature in order to reduce thermal load on the valves.

In the example illustrated herein, a position (open/close) of intake/exhaust valves during a positive overlap period, when the engine is operated in the four-valve blow-through mode is shown. Further, direction of flow of gases is indicated in arrows. Intake valves I2, intake valve I4, exhaust valve E1, and exhaust valve E3 may be concurrently open (indicated as open circles) during the positive overlap period. As a result, boosted intake air may flow from intake valve I2 to exhaust valve E1, and from intake valve I4 to exhaust valve E3 to purge residual gas from the cylinder. That is, when all four valves are open (such as during the four-valve blow-through mode), the gases (that is, intake air) may flow via a short flow path (e.g., from I2 to E1, and from I4 to E3, as indicated by arrows). Due to the short flow path, a portion of the boosted intake air that is blown-through the cylinder may be lost to the exhaust system.

In one example, the boosted air that is lost to the exhaust system may be utilized to expedite heating of an exhaust catalyst during cold-start conditions when a temperature of the catalyst is less than a light-off temperature required for activation of the catalyst. For example, during the four-valve blow-through mode, cylinder may be operated with a rich cylinder air-to-fuel ratio leading to a rich combustion. Products of the rich combustion may exothermically react with oxygen in the air in the exhaust, thereby releasing heat at/near the catalyst, which may increase a temperature of the catalyst. Consequently, activation of the catalyst may be expedited.

In another example, engine may be operated in the four-valve blow-through mode instead of a two-valve blow-through mode when a temperature of one or more intake and/or exhaust valves is greater than a threshold temperature above which degradation of the valves may occur. For example, it may be advantageous to utilize four-valve blow-through instead of two-valve blow-through (discussed below at FIG. 3B, and further at FIGS. 5 and 7) during cold-start conditions to increase a speed of the turbine to a desired speed when one or more valve temperature is greater than the threshold temperature to reduce thermal load on the valves. By utilizing the four-valve blow-through mode, due to all four valves being utilized, excess heating of the valves may be reduced.

In this way, engine may be operated in the four-valve blow-through mode to expedite heating of a catalyst, and/or to reduce excess heat damage to the intake and/or exhaust valves during the blow-through period.

Turning to FIG. 3B, it shows an example four-valve cylinder head including two intake and two exhaust valves during a two-valve diagonal blow-through condition. As such, two-valve diagonal blow-through may be provided to reduce an amount of fresh air reaching the exhaust port during blow-through conditions. For example, two-valve blow-through may be provided during low speed conditions when a torque demand is greater than a threshold torque demand. By utilizing two-valve blow-through, a path length for flow of gas may be increased. As a result, an amount of fresh air trapped in the cylinder may increase, and an amount of fresh air leaking to the exhaust ports may decrease.

During two-valve diagonal blow-through, a duration of positive overlap provided for a first pair of intake/exhaust valves may be greater than a first threshold duration while a duration of overlap for a second pair of intake/exhaust valves of the four-valve cylinder may be less than a second threshold duration. The first threshold duration may be greater than or equal to the second threshold duration. In other words, a duration of overlap between the first intake/exhaust valve pair is greater than the duration of overlap between the second intake/exhaust valve pair.

Herein, intake valve of the intake/exhaust valve pair with greater duration of overlap (that is, the first intake/exhaust valve pair) will be referred to as the scavenging intake valve. Similarly, the exhaust valve of the intake/exhaust valve pair with greater duration of overlap will be referred to as the scavenging exhaust valve. Further, the intake valve of the intake/exhaust valve pair with shorter duration of overlap (that is the second intake/exhaust valve pair) will be referred to as the non-scavenging intake valve. Similarly, the exhaust valve of the intake/exhaust valve pair with shorter duration of overlap will be referred to as the non-scavenging exhaust valve.

In the example illustrated herein, a position (open/close) of intake/exhaust valves during the two-valve diagonal blow-through is shown. Further, direction of flow of gases from intake valve I4 to exhaust valve E1 is indicated in arrows. As such, a distance from a center of intake valve I4 to a center of exhaust valve E1 may be greater than a distance from a center of intake valve I2 to the center of exhaust valve E1, or greater than a distance from the center of intake valve I4 to a center of exhaust valve E3. During two-valve diagonal blow-through, intake valve I4 and exhaust valve E4 may be open, whereas, the intake valve I2 and exhaust valve may be closed. Fresh air may be delivered to the cylinder through the intake valve I4. The fresh air may flow from intake valve I4 to exhaust valve E1 purging any residual exhaust gases. The path of flow of gases from the intake to the exhaust via intake and exhaust valves positioned diagonally is longer than the path of flow of gases from the intake to the exhaust via valves positioned in a row or a column next to each other. Therefore, by closing one intake and one exhaust valve, flow of gases may be directed in a diagonal path or a curved diagonal path.

By flowing blow-through air via the longer diagonal path of flow, an amount of fresh intake air retained in the cylinder may increase, thereby increasing the cylinder air charge. Consequently, torque output may be increased. Further, due to the longer diagonal path flow, an amount of blow-through air leaking to the exhaust manifold may be reduced. Still further, by utilizing two-valve blow-through, residual in-cylinder exhaust gases may be purged more efficiently, which may reduce in-cylinder temperatures and as a result, tendency for knock may be reduced. For example, during diagonal blow-through mixing of gases (fresh air and combusted residual in-cylinder exhaust gas) may be reduced, thereby allowing more combusted residual gas (and therefore, less mixed gas including air and combusted gas) to be purged from the cylinder.

In the given example, a closed or open position of the valves is illustrated. However, it must be appreciated that at certain time points during the diagonal blow-through, all four valves may be open with valve lifts of the scavenging valves greater than the valve lifts of the non-scavenging valves. As a result, an amount of blow-through flowing via the scavenging valves may be greater than the amount of blow-through flowing via the non-scavenging valves. In some examples, the amount of valve overlap between the non-scavenging valves and the amount of valve lift of the scavenging valves may be low such that the amount of blow-through flowing through the non-scavenging valves may be negligible.

Details of valve lifts and valve durations during the two-valve blow-through will be further elaborated at FIG. 7. Details of valve lifts and valve durations during the four-valve blow-through will be further elaborated at FIG. 8.

Turning to FIG. 3C, it shows an example four-valve cylinder head including two intake and two exhaust valves during engine operation in a masked two-valve blow-through mode. For example, mask 304 may be provided to one or more scavenging valves such that the mask extends from a portion of an inner wall of the cylinder head about a valve seat (not shown) and into the combustion chamber. The mask may block the portion of opening of the scavenging valve between the scavenging valve seat and the scavenging valve during valve lifts. Further, the mask may be located such that the mask blocks the shortest flow path between a scavenging intake valve and a scavenging exhaust valve. In one example, a height of the mask may be less than 100% of the total valve lift of the valve to which the mask is provided When the valve lift amount is equal to or less than the mask height, the mask may completely block the portion of opening of the intake valve between the valve seat and the valve. For example, at a valve lift equal to the mask height, intake air or air-fuel mixture from the intake manifold may be blocked by the mask and may not enter the cylinder through the portion of the valve blocked by the mask. However, the intake air or air-fuel mixture may flow around the mask. When the valve lift amount is greater than the mask height, the valve opening may be blocked between the valve seat up to an end of the mask, while a portion of the intake valve opening between the end of the mask and the intake valve may not be blocked.

In the present example, scavenging intake valve I4 is masked. However, it must be appreciated that the mask may be additionally or alternatively applied to one or more scavenging intake and/or exhaust valves.

During engine operation in the masked two-valve blow-through mode, intake valve I4 and exhaust valve E1 may be open, whereas, the intake valve I2 and exhaust valve E3 may be closed. Fresh boosted air may be delivered to the cylinder through the intake valve I4. The fresh air may flow from intake valve I4 to exhaust valve E1 purging any residual exhaust gases. However, shortest flow path 310 may be blocked by the mask 310. Further, in order to improve the effectiveness of the mask, valve lifts may be provided at the mask height with extended dwell times for the masked valve(s).

In one example, a size of the scavenging intake and/or exhaust valves may be adjusted to optimize the scavenged flow. For example, a size of the scavenging exhaust valve may be smaller with respect to a size of the scavenging intake valve in order to retain more boosted air during blow-through in the cylinder. In another example, the size of the scavenging exhaust valve may be smaller with respect to a size of the non-scavenging exhaust valve in order to optimize blow-through flow. As such, the scavenging intake valve and the non-scavenging intake valve may be of same size to help flow tumble in an orderly manner at BDC.

FIG. 3D shows an example four-valve cylinder head including two intake valves and two exhaust valves during engine operation in a masked four-valve blow-through mode. As discussed above, mask 304 may be provided to one or more scavenging valves to increase a path of flow from the intake to the exhaust. In the example illustrated herein all the four valves are masked. However, during the masked four-valve blow-through, any one or two or three valves may be masked. As discussed above, by providing valve lifts at mask heights, the mask may block a portion of the valve opening equivalent to the mask height. Further, by providing valve lifts at mask heights, the intake air and/or the intake air-fuel mixture may be diverted to flow around the mask, thereby increasing the minimum length of flow of gases.

In this way, by utilizing a mask, a minimum flow path of gases from the intake to the exhaust may be increased.

FIG. 4 shows an example routine 400 for determining a type of blow-through based on engine operating conditions. For example, during a first condition, a four valve blow-through may be provided. The first condition may include a cold start condition when an exhaust catalyst temperature is below an activation temperature. A four-valve blow-through may be provided to expedite heating of the exhaust catalyst by providing extra mass and enthalpy to the exhaust. During a second condition, different from the first condition, a two valve diagonal blow-through may be provided. The second condition may include a low speed and high load condition. The two-valve blow-through may be provided to provide more torque by increasing a cylinder air charge. The method of FIG. 4 may be stored as executable instructions in non-transitory memory of controller 12 shown in FIGS. 1-2.

At 410, routine 400 may include estimating and/or measuring engine operating conditions. Engine operating conditions may include engine speed, torque output, exhaust temperature, exhaust catalyst temperature, turbine speed, intake manifold pressure (MAP), boost pressure, barometric pressure (BP), exhaust manifold pressure, pedal position, vehicle speed, etc.

Next, at 412, based on the estimated engine operating conditions, routine 400 may include determining if blow-through conditions have been met. In one example, blow-through conditions may be met in response to a tip-in event.

In another example, blow-through conditions may be met in response to a turbine speed being lower than a threshold at the time of the tip-in. Herein, in response to the tip-in event, compressed intake air may be blown through and directed from the intake manifold to the exhaust manifold to spin-up the turbine and increase turbine speed and engine boost.

In still another example, blow-through conditions may be met when a torque demand is greater than a threshold torque demand and an engine speed is less than a threshold engine speed. Herein, blow-through may provide extra cylinder air charge required to increase the torque to meet the torque demand.

In yet another example, blow-through conditions may be met when there is indication of knock. For example, indication of knock may be determined based on a knock sensor reading. High cylinder temperatures and pressure may increase the occurrence of knock which may lead to reduced engine performance, and drivability. In order to reduce cylinder temperature and pressure, blow-through may be provided which may reduce charge temperatures by reducing the amount of hot residual gas from the cylinder clearance volume and trapping additional fresh air in the clearance volume.

Confirming blow-through conditions may further include confirming that intake manifold pressure (MAP) is higher than an exhaust manifold pressure. That is, a positive pumping regime may be confirmed. As such, there may be errors in the estimation of MAP and exhaust manifold pressure. For example, the estimated values of MAP and exhaust manifold pressure may be 50 In Hg and 48 In Hg respectively, allowing for a positive pumping regime and allowing for blow-through air to be directed from the intake manifold to the exhaust manifold. However, the actual values of MAP and exhaust manifold pressure may be 48 In Hg and 50 In Hg respectively. This would cause air and exhaust gas to actually flow in an opposite direction, from the exhaust manifold to the intake manifold.

To reduce such errors, a dead-band may be included when comparing MAP to exhaust manifold pressure (EXHMAP). For example, to confirm that blow-through conditions are met, it may be confirmed that MAP is higher than exhaust manifold pressure by at least a threshold amount (e.g., MAP>EXHMAP+X). In comparison, to enable EGR (which is a flow in the opposite direction from the exhaust manifold to the intake manifold), it may be confirmed that exhaust manifold pressure is higher than MAP by at least a threshold amount (e.g., EXHMAP>MAP+Y). By including deadbands when comparing intake and exhaust manifold pressures, tolerance for variation in measurement or estimation of intake and exhaust manifold pressures is provided.

Upon confirming blow-through conditions, routine 400 may proceed to 416. At 416, routine 400 may include determining if the exhaust catalyst temperature is greater than a catalyst light-off temperature. In other words, the routine may determine if the catalyst has attained an activation temperature. If the answer at 416 is NO, the routine may proceed to 426.

At 426, the routine may include operating the engine in a four-valve blow-through mode. Operating in the four-valve blow-through mode includes adjusting the variable cam timing device to shift a camshaft position, thereby adjusting an intake and/or exhaust valve timing of the engine cylinder (s) from a first valve timing corresponding to no positive valve overlap (or lower positive valve overlap) to a second valve timing corresponding to positive intake valve to exhaust valve overlap (or increased positive valve overlap). Then, once the valve timing has been adjusted, intake air may be directed from the intake manifold, downstream of a compressor, to the exhaust manifold, upstream of a turbine, via positive overlap through the one or more engine cylinder (s). In addition, during the directing, a fuel injection amount may be adjusted based on the amount of air directed via positive valve overlap so as to maintain an exhaust air-to-fuel ratio at or around stoichiometry. For example, during the directing, cylinder fuel injection may be temporarily shifted to a richer fuel injection, wherein a degree of richness of the rich fuel injection is based on the amount of air directed as blow-through air via the cylinders using positive valve overlap. The richer fuel injection may generate a richer combustion event. The richer combustion event may generate richer combusted gas including short chain hydrocarbons and carbon monoxide. The richer exhaust thus generated may react with the blow-through air in the exhaust manifold in an exothermic reaction. As a result, exhaust temperature may be increased and consequently, catalyst heating may be expedited by the increased exhaust temperatures.

Returning to 416, if the catalyst temperature is greater than or equal to the light-off temperature (that is, if the answer at 416 is YES), the routine may proceed to 420. At 420, the controller may determine if a temperature of one or more exhaust valves is greater than a threshold valve temperature. In one example, the controller may determine if a temperature of one or more intake valves and/or exhaust valves is greater than a threshold valve temperature. Returning to 420, if the answer at 420 is NO, the routine may proceed to 428.

At 428, the routine may include providing two-valve diagonal blow-through. For example, two-valve blow-through may be provided by adjusting intake and exhaust valve timings such that a duration of positive overlap between a first intake (e.g., intake valve I4 at FIG. 3B) and a first exhaust valve (e.g., intake valve E1 at FIG. 3B) may be greater than a duration of positive overlap between a second intake (e.g. intake valve I2 at FIG. 3B) and a second exhaust valve (e.g., intake valve E4 at FIG. 3B). The first intake and the first exhaust valve may be positioned diagonally on the cylinder head as illustrated at FIG. 3B. In other words, for a majority of positive overlap duration, only two valves (one intake and one exhaust) positioned diagonally may be utilized for blow-through. As a result, a distance of flow path of gas from an intake valve to an exhaust valve may be increased. By increasing the distance of flow path of gas, an amount of fresh air retained in the cylinder may be increased. Consequently, cylinder temperatures may be decreased, which may reduce knock. Further, excess catalyst heating may be reduced and increased torque may be achieved at low speed. Details of two-valve diagonal blow-through will be further elaborated at FIGS. 5 and 7.

In one example, the inlet valve utilized for two-valve blow-through may be masked to further increase the distance of flow path during the blow-through. In another example, the exhaust valves utilized for two-valve blow-through may be masked to further increase the distance of flow path during blow-through. In still another example, both the inlet valve and the outlet valve may be masked to increase the distance of flow path during the blow-through.

Returning to 420, if the answer at 420 is YES, the routine may proceed to 426. At 426, the routine may include providing four-valve blow-through. That is, if it is determined that a temperature of one or more exhaust valves is greater than threshold, the engine may be operated in the four-valve blow-through mode instead of the two-valve blow-through mode in order to reduce thermal load on the valves utilized for blow-through.

Four-valve blow-through may be provided by adjusting intake and exhaust cam timings such that all four valves may be utilized for blow-through. During four-valve blow-through, the flow of gas may not take a diagonal path; instead gas may flow through a shorter path between an intake valve and an exhaust valve. Consequently, boosted air, that is utilized to purge the exhaust gas, may reach the exhaust manifold. That is, an amount of boosted air in the exhaust manifold may be greater than threshold. Consequently, when the engine is operated rich, excess air in the exhaust manifold may react with the rich combusted gases increasing a temperature of the exhaust gases in the exhaust manifold. As a result, catalyst heating may be expedited.

Further, the increased mass and enthalpy of exhaust gases may be utilized to spin up a turbine, thereby reducing turbo lag.

In this way, four-valve blow-through may be utilized during cold-start conditions to expedite heating of an exhaust catalyst and to reduce turbo lag. Further, four-valve blow-through may be provided when one or more intake and/or exhaust valve temperature is greater than threshold instead of two-valve diagonal blow-through. As such, two-valve blow-through may increase a valve temperature of one or more valves utilized for blow-through. Therefore, in order to prevent damage of the valves due to excess valve temperature, four-valve blow-through may be utilized when one or more intake or exhaust valve temperature is greater than the threshold valve temperature.

Returning to 416, if the catalyst temperature is not greater than the light-off temperature, four-valve blow-through may be provided to expedite heating of the exhaust catalyst by increasing exhaust temperature. For example, as discussed above, when four-valve blow-through is provided, boosted intake air may flow into the exhaust manifold during the overlap period. Further, engine may be operated rich. Gases from the rich combustion may react with the air in the exhaust exothermically. As a result, exhaust temperatures may increase and consequently, catalyst heating may be expedited.

Returning now to 412, if it is determined that blow-through conditions are not met, routine 400 may proceed to 414. At 414, the routine may include operating the engine without blow-through. In one example, when operating in the non blow-through mode, the camshaft position is adjusted so that no positive valve overlap is provided. For example, the position providing no positive valve overlap may be a default position of the camshaft. However, in other examples, when operating in the non blow-through mode, non-zero positive valve overlap may be provided and valve overlap may be reduced such that blow-through is negligible.

Next, at 418, routine 400 may include determining of a first condition is met. The first conditions may be based on one or more engine operating conditions, and may include engine speed and engine load. If the first condition is satisfied, the routine may proceed to 424. At 424, the routine may include operating all of the cylinders of the engine with two valves (that is, with one intake valve and one exhaust valve). If the first condition is not satisfied, the routine may proceed to 422. At 422, the routine may include operating all of the cylinders of the engine with four-valves (that is, with two intake valves and two exhaust valves).

In one example, if the engine is not operated in the blow-through mode (that is, during engine operation in the no blow-through mode), cam phasing may be adjusted for engine operation in a normal mode. For example, normal mode may include adjusting cam phasing to provide intake valve and exhaust valve overlap such that a desired amount of internal residual for improved fuel economy may be obtained.

In this way, based on engine operating conditions, engine may be operated in the no blow through mode, in the two-valve diagonal blow-through mode, or in the four-valve blow-through mode.

Figure 5:
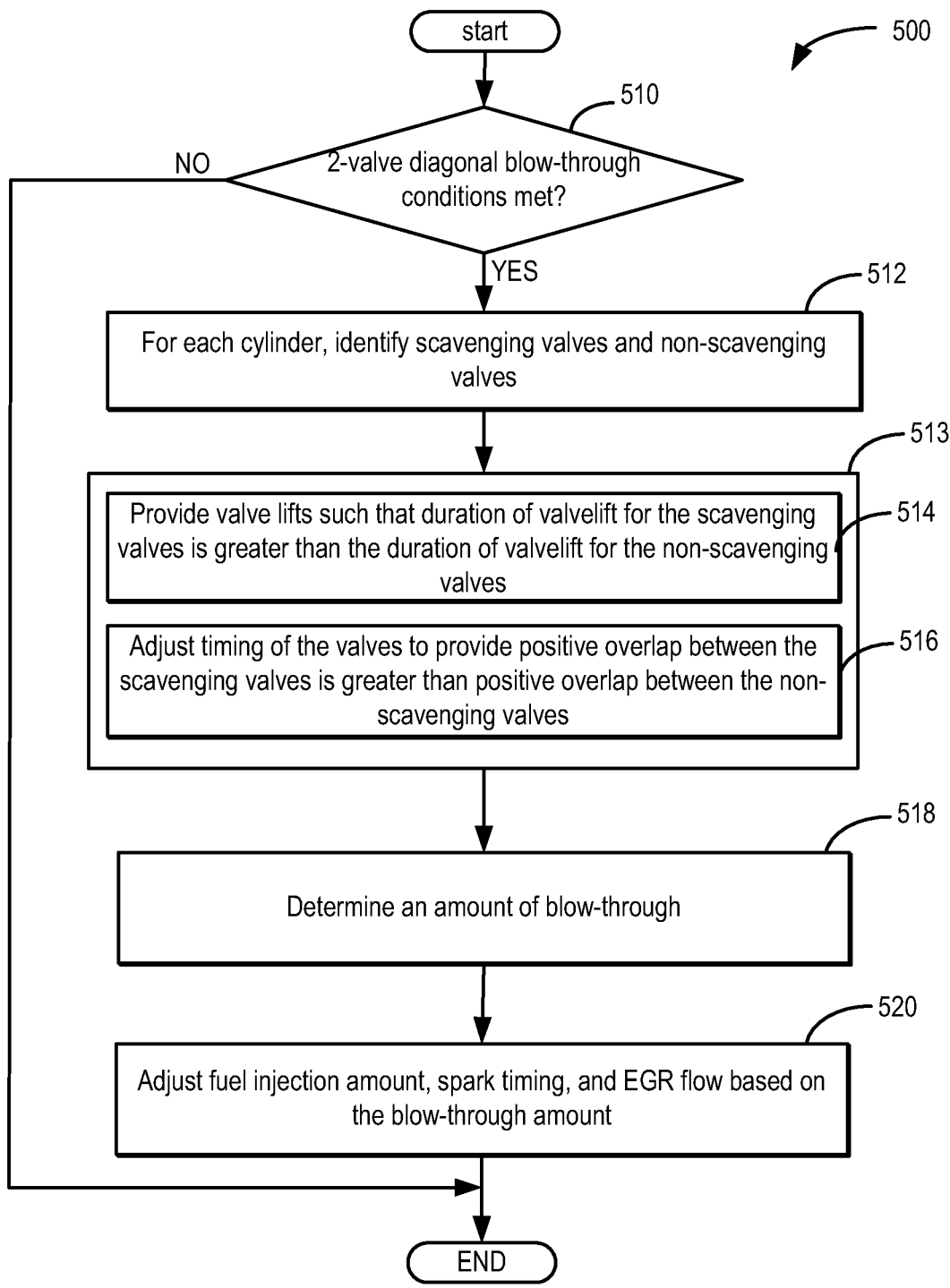

Turning to FIG. 5, it shows routine 500 for providing a two-valve diagonal blow-through. For example, two-valve diagonal blow-through may be provided in order to increase a path length of gas flow from the intake vale to the exhaust valve. By increasing the path length, an amount fresh air that may leak in to the exhaust manifold while purging exhaust gas in the cylinder during the blow-through may be reduced. In other words, an amount of fresh air trapped in the cylinder may be increased. By increasing the amount of fresh air in the cylinder, torque output may be improved, in particular at low engine speeds, for example.

At 510, routine 500 includes determining if two-valve diagonal blow-through conditions are satisfied. As discussed at FIG. 4, the two-valve blow-through conditions may include one or more of a tip-in event, a turbine speed lower than a threshold at the time of the tip-in, a torque demand greater than a threshold torque demand and an engine speed less than a threshold engine speed, and an indication of knock. Two-valve blow-through conditions may further include a valve temperature of each of two intake and two exhaust valves less than a threshold temperature. At 510, if the two-valve blow-through conditions are not satisfied, routine 500 may end. If the two-valve blow-through conditions are satisfied, routine 500 may proceed to 512.

At 512, routine 500 may include determining scavenging valves and non-scavenging valves for each cylinder. Scavenging valves may include a scavenging intake valve (e.g., intake valve I4 at FIG. 3B) and a scavenging exhaust valve (e.g., exhaust valve E1 at FIG. 3B) that may overlap near top dead center (TDC) for a duration greater than a first threshold duration in order to provide blow-through. Non-scavenging valves may include a non-scavenging intake valve (e.g., intake valve I2 at FIG. 3B) and a non-scavenging exhaust valve (e.g., exhaust valve E3 at FIG. 3B) that may overlap for a duration less than a second threshold duration during blow-through. The first threshold duration may be greater than the second threshold duration. Determination of the scavenging valves and the non-scavenging valves may be based on a valve temperature, for example. Further, the scavenging intake valve may be positioned diagonally across the scavenging exhaust valve.

Upon determining scavenging and non-scavenging valves, routine 500 may proceed to 513. At 513, routine 500 may include operating the engine in a two-valve blow-through mode. Engine operation in the two-valve blow-through may include (at 514) providing valve lifts such that a duration of valve lift for the scavenging valves is greater than a duration of valve lift for the non-scavenging valves.

Further, at 516, a timing of the valves may be adjusted such that a duration of positive overlap between the scavenging valves is greater than a duration of positive overlap between the non-scavenging valves. For example, a closing timing of the scavenging exhaust valve may be retarded with respect to a closing timing of the non-scavenging exhaust valve, and an opening timing of the scavenging intake valve may be advanced with respect to the opening timing of a non-scavenging intake valve. An opening time of the scavenging exhaust valve and the non-scavenging exhaust valve may coincide, and a closing time of the scavenging intake valve and the non-scavenging intake valve may also coincide. By retarding the closing time of the exhaust valve and advancing the opening time of the scavenging intake valve, the scavenging exhaust valve and the scavenging intake valve may be concurrently open for a longer duration than the non-scavenging valves. That is, the scavenging valves may be operated with greater overlap duration with respect to the non-scavenging valves. Details of valve lifts and valve timings that may be employed during two-valve blow-through will be further elaborated at FIG. 7.

Next, at 518, routine 500 may include determining an amount of cylinder blow-through. In one example, the blow-through amount may be based on a total mass flow through the cylinder, and a maximum cylinder volumetric efficiency curve. An amount of engine blow-through may be determined based on a sum of blow-through amounts of each cylinder over one or more engine cycles.

Upon determining the blow-through amount, routine 500 may proceed to 520. At 520, routine 500 may include adjusting engine operation based on the blow-through amount. For example, a fuel injection amount may be adjusted proportionately with the blow-through amount so as to obtain an overall stoichiometric exhaust air-to-fuel ratio. The fuel injection amount may be adjusted by adjusting a fuel injector pulse width, for example. Further, a spark timing, an EGR flow, and a flow from PCV may be adjusted based on the amount of blow-through. For example, the spark timing may be advanced as the amount of blow-through increases, EGR flow may be increased as the amount of blow-through increases due to reduced internal EGR, and PCV flow may not be affected.

In some examples, one or more engine operating parameters may be adjusted to obtain a desired blow-through amount. For example, a throttle position, and a wastegate position may be adjusted to obtain the desired blow-through amount. In one example, a wastegate may be closed and a throttle may be opened to increase the blow-through amount to the desired amount. Alternatively, if blow-through is greater than desired, the throttle may be closed and the wastegate may be opened to decrease the blow-through amount. In some other examples, a duration of positive valve overlap may be adjusted to obtain the desired blow-through amount. For example, when the blow-through amount is less than the desired blow-through amount, the duration of positive overlap may be increased, and when the blow-through amount is greater than desired, the duration of positive overlap may be decreased. In further examples, the blow-through amount may be decreased by opening a compressor bypass valve. Alternatively, the blow-through amount may be increased by engaging a supercharger.

As such, during engine operation in a blow-through mode (e.g., four-valve blow-through mode), there may be loss of fresh air to the exhaust system due to short flow path of gases from intake to exhaust. Therefore, a rich air-to-fuel ratio may be utilized during combustion in order to maintain an overall exhaust air-to-fuel ratio at stoichiometry. However, when the engine is operated in the two-valve diagonal blow-through mode as discussed herein, the loss of fresh air to the exhaust system may be reduced due to increased flow path of gases from intake to exhaust. Consequently, for a given desired blow-through amount, a less rich cylinder air-to-fuel ratio may be utilized when operating in a two-valve diagonal blow-through mode compared to the cylinder air-to-fuel ratio that may be utilized during combustion when operating in the four-valve blow-through mode. In other words, the cylinder air-to-fuel ratio that may be utilized when operating the engine in a two-valve blow-through mode for a desired blow-through amount may be less rich than the cylinder air-to-fuel ratio that may be utilized when operating the engine in a four-valve blow-through mode for the same desired blow-through amount. For example, the in cylinder air-to-fuel ratio during the two-valve blow-through mode may be less rich than the four-valve blow-through mode because in the two-valve blow-through mode, hot residual gas may be more effectively purged with reduced amount of blow-through air escaping in to the exhaust manifold.

In one example, the in-cylinder AFR may be adjusted to maintain an overall stoichiometric air-to-fuel ratio or other target based on the overlap mode. For example, during a second overlap mode, the engine may be operated with a richer cylinder air-to-fuel ratio than a first overlap mode to maintain a stoichiometric exhaust air-to-fuel ratio, wherein the second overlap mode is the four valve blow-through mode and the first overlap mode is the two-valve blow-through mode.

Further, when the engine is operated in the two-valve blow-through mode, mixing of the gas flow may be controlled more efficiently compared to the four-valve blow-through mode. As a result, hot residual gas may be purged more efficiently, thereby reducing in-cylinder temperatures, and consequently, reducing knock.

In this way, by diagonally directing the blow-through air via diagonal intake and exhaust valves, a distance of flow path of gases from the intake valve to the exhaust valve may be increased resulting in more blow-through air trapped in the clearance volume of the cylinder. As a result, torque output may be increased. Further in-cylinder temperatures may be reduced, decreasing the tendency for knock. Still further, due to reduced blow-through air in the exhaust, the cylinder may be operated less rich. The less rich combustion and decreased air in the exhaust may result in reduced exhaust gas temperature, and therefore, excess increase in exhaust catalyst temperature may be reduced. As a result, catalyst degradation may be reduced and the amount of blow-through that may be utilized (that may be otherwise limited by excess catalyst temperature) may be increased.

Figure 6:
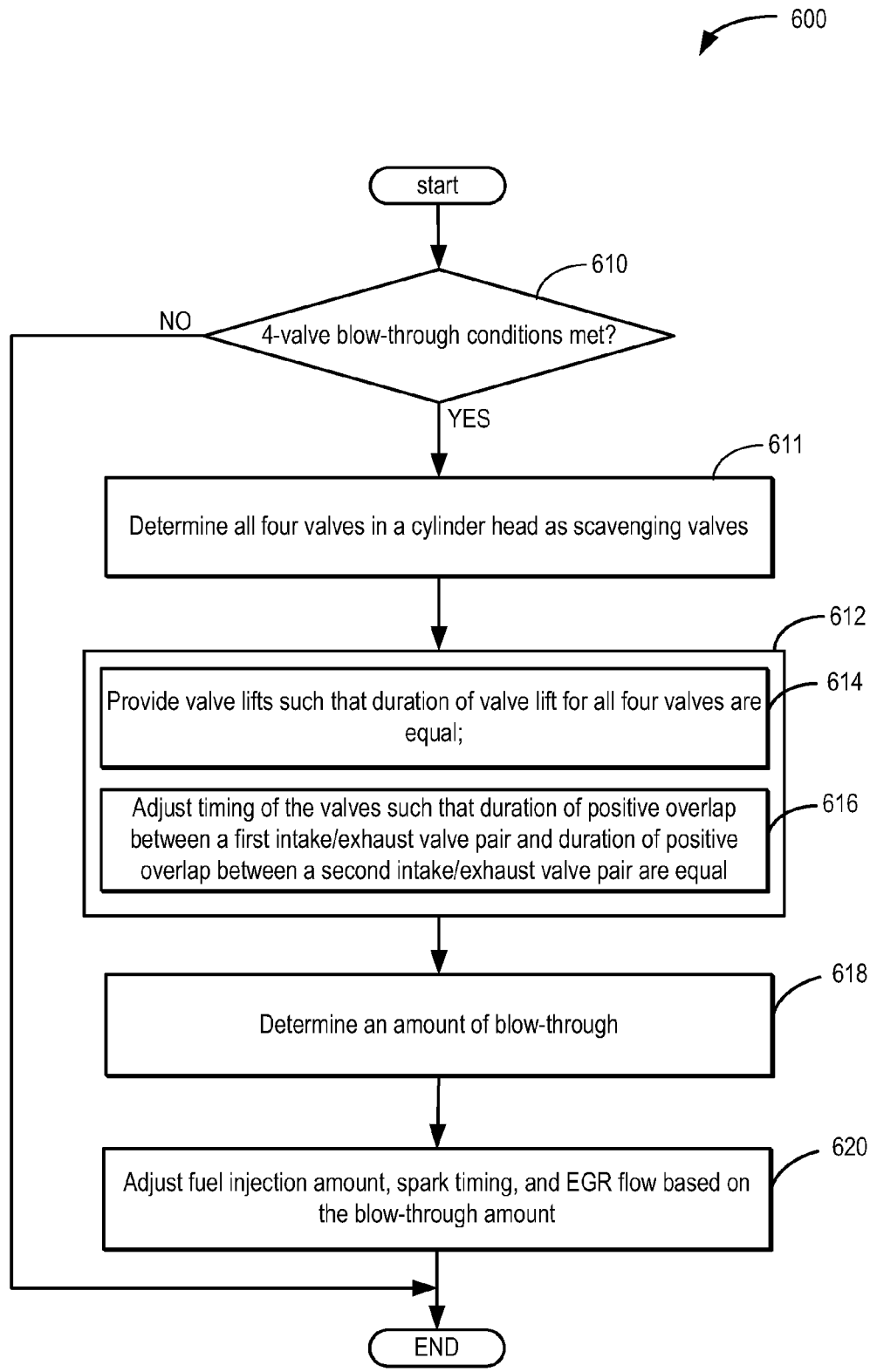

Turning to FIG. 6, it shows routine 600 for operating the engine in a four-valve blow-through mode. For example, four-valve blow-through may be provided to heat an exhaust catalyst during cold-start conditions when the catalyst temperature is below a light-off temperature. During four-valve blow-through, engine may be operated with positive overlap such that the boosted blow-through air may be directed into the engine exhaust. Further, engine may be operated with a rich cylinder air-to-fuel ratio. The blow-through air may exothermically react with the rich cylinder combustion mixture in the exhaust manifold, near the exhaust catalyst, thereby heating the catalyst. In some examples, four-valve blow-through may be provided instead of the two-valve blow-through when a temperature of one or more valves of a cylinder is greater than a threshold temperature above which valve degradation may occur.

At 610, routine 600 includes determining if four-valve blow-through conditions are satisfied. As discussed at FIG. 4, the four-valve blow-through conditions may include one or more of a tip-in event, a turbine speed lower than a threshold at the time of the tip-in, a torque demand greater than a threshold torque demand and an engine speed less than a threshold engine speed, and an indication of knock. Four-valve blow-through conditions may further include a valve temperature of one or more valves in a cylinder greater than a threshold temperature. For example, when the valve temperature of one or more valves in the cylinder is greater than threshold, four-valve blow-through may be employed instead of two-valve blow-through to reduce damage to the valves due to high valve temperatures. At 610, if the four-valve blow-through conditions are not satisfied, routine 600 may end. If the four-valve blow-through conditions are satisfied, routine 600 may proceed to 611.

At 611, all four valves (two intake and two exhaust) valves may be determined as scavenging valves. Next, at 612, routine 600 may include operating the engine in the four-valve blow-through mode. For example, engine operation in the four-valve blow-through mode may include, at 614, providing valve lifts such that a duration of valve lifts for the two intake valves (e.g., I2 and I4 at FIG. 3A) and the two exhaust valves (e.g., E1 and E3 at FIG. 3A) may be equal. Further, at 616, four-valve blow-through may include adjusting a timing of the valves such that a duration of positive overlap between a first intake/exhaust valve pair and positive overlap between a second intake/exhaust valve pair are equal. That is, an opening timing and a closing timing for the first intake/exhaust valve pair, and an opening timing and a closing timing for the second intake/exhaust valve pair may coincide. Details of valve lifts and valve timings that may be employed during four valve blow-through will be further elaborated at FIG. 8.

Next, at 618, routine 600 may include determining an amount of cylinder blow-through. The blow-through amount may be based on a total mass flow through the cylinder, and a maximum cylinder volumetric efficiency curve. Upon determining the blow-through amount, routine 600 may proceed to 620. At 620, routine 600 may include adjusting engine operation based on the blow-through amount. For example, a fuel injection amount may be adjusted proportionately with the blow-through amount so as to obtain an overall stoichiometric exhaust air-to-fuel ratio. The fuel injection amount may be adjusted by adjusting a fuel injector pulse width, for example.

Further, as discussed with respect to the two-valve blow-through at FIG. 5, a spark timing, an EGR flow, and a flow from PCV may be adjusted based on the amount of blow-through. For example, the spark timing may be advanced as the amount of blow-through increases, EGR flow may be increased as the amount of blow-through increases (to compensate for reduced internal EGR during blow-through), and PCV flow may not be affected.

It must be noted that the under given engine operating conditions (e.g., conditions resulting in a given desired blow-through amount), amount of air trapped in the cylinder if the engine is operated in the two-valve blow-through mode may be greater than the amount of air trapped in the cylinder (hence, the total cylinder air flow) if the engine is operated in the four-valve blow-through mode. Consequently, under the given operating conditions, the spark timing for the two-valve blow-through mode may be advanced with respect to the spark timing for the four-valve blow-through mode, and external EGR flow for the two-valve blow-through mode may be increased with respect to external EGR flow for the four-valve blow-through mode.

In this way, four-valve blow-through may be provided to expedite heating of the exhaust catalyst and/or reduce valve degradation.

Next, FIG. 7 shows a map 700 of valve timing and valve lifts provided to an example scavenging intake valve, an example non-scavenging intake valve, an example scavenging exhaust valve, and example non-scavenging exhaust valve during two-valve diagonal blow-through conditions, and piston position, with respect to an engine position, for a given engine cylinder. As such, an engine controller may be configured to operate an engine boosting device, such as a turbocharger, to drive a boosted air flow through the engine cylinders while operating the engine with a positive intake to exhaust overlap. The engine controller may utilize a map, such as map 700, to identify the positive overlap period.

As such, two-valve blow-through may be provided to provide more torque at low speed, reduce occurrence of knock by decreasing in-cylinder temperatures, and reduce excess heating of the exhaust catalyst that may occur during blow-through operations such as a four-valve blow-through. As discussed at FIGS. 4 and 5, the two-valve blow-through conditions may include one or more of a tip-in event, a turbine speed lower than a threshold at the time of the tip-in, a torque demand greater than a threshold torque demand and an engine speed less than a threshold engine speed, and an indication of knock. Two-valve blow-through conditions may further include a valve temperature of each of two intake and two exhaust valves less than a threshold temperature.

Map 700 illustrates an engine position along X axis in crank angle degreed (CAD). Curve 702 depicts piston position (along the Y axis), with reference to their location from top dead center (TDC) and/or bottom dead center (BDC), and further with reference to their location within the four strokes (intake, compression, power, and exhaust) of an engine cycle.

During the intake stroke, generally, the exhaust valves close and intake valves open. Air is introduced into the cylinder via the corresponding intake passage, and the cylinder piston indicated by sinusoidal curve 702 moves to the bottom of the cylinder so as to increase the volume within the cylinder. During the compression stroke, the intake valves and exhaust valves are closed. The piston moves toward the cylinder head so as to compress the air within combustion chamber. During the expansion stroke, the expanding gases push the piston back to BDC. A crankshaft converts this piston movement into a rotational torque of the rotary shaft. During the exhaust stroke, in a traditional design, exhaust valves are opened to release the residual combusted air-fuel mixture to the corresponding exhaust passages and the piston returns to TDC.

Valve lifts and valve timings for the scavenging exhaust valve (e.g., exhaust valve E3 at FIG. 3B) and the non-scavenging exhaust valve (e.g., exhaust valve E1 at FIG. 3B) are shown by curves 704 and 706 respectively. Valve lifts and valve timings for the scavenging intake valve (e.g., intake valve I2 at FIG. 3B) and non-scavenging intake valve I4 (e.g., intake valve I4 at FIG. 3B) are shown by curves 708 and 710 respectively. In the present example, exhaust valves E1 and E3 may open at the same time. However, a closing timing for the scavenging exhaust valve may be retarded with respect to a closing timing for the non-scavenging exhaust valve. As a result, the scavenging exhaust valve E1 may remain open for a duration longer than the non-scavenging exhaust valve E3. Further, a timing for opening of scavenging intake valve I4 may be advanced with respect to a timing of opening of the non-scavenging intake valve I2, while scavenging intake valve I4 and non-scavenging intake valve I2 may close at the same time. As a result, scavenging intake valve I4 may be open for a duration longer than non-scavenging intake valve I4. Both scavenging exhaust valve E3 and scavenging intake valve I4 may remain open concurrently for a duration of positive overlap 712.

In some examples valve overlap duration 712 may be longer than the valve overlap duration described herein in order to provide good scavenging and torque when an intake pressure is greater than an exhaust pressure. In some other examples, overlap duration 712 may be shorter than the overlap duration described herein in order to reduce an amount of blow-through provided.

In some examples, a timing of the positive overlap may be advanced or retarded with respect to the timing of the positive overlap discussed in this example. For example, in the present example, maximum valve overlap occurs at 360 degrees TDC. In one example, the timing of the positive overlap period may be advanced, wherein maximum valve overlap may occur prior to the piston reaching 360 degrees TDC at the end of the exhaust stroke. In another example, the timing of the positive overlap period may be retarded, wherein maximum valve overlap may occur after the piston reaches TDC at the end if the exhaust stroke.

Non-scavenging exhaust valve E3 and non-scavenging intake valve I2 may remain open for a reduced amount of time during the positive overlap period 712 such that blow-through via the non-scavenging intake and exhaust valves are negligible. Moreover, during the duration of positive overlap when the non-scavenging valves are open, the valve lift of the non-scavenging valves are may be low such that blow-through via the non-scavenging intake and exhaust valves may be negligible. That is, during the positive overlap period 712, a majority of the boosted intake air may be directed to the cylinder via the scavenging intake valve and a majority of the residual gas purged by the boosted intake air may exit the cylinder via the scavenging exhaust valve. In other words, only the scavenging intake valve and the scavenging exhaust valve may be utilized for blow-through. Further, the boosted air routed from the scavenging intake valve to the scavenging exhaust valve may flow through a diagonal path since the scavenging intake valve is located diagonally across the scavenging exhaust valve in the cylinder head. Further, flow via the non-scavenging valves may be negligible due to low valve lifts and short duration of valve opening. As a result, a flow path of gas from the intake to exhaust may be increased when two-valve diagonal scavenging is utilized.

In this way, valve timings may be adjusted to provide two-valve diagonal blow-through.

Turning next to FIG. 8, it shows a map 800 of valve timing and valve lifts provided to an example scavenging intake valve, an example non-scavenging intake valve, an example scavenging exhaust valve, and example non-scavenging exhaust valve during two-valve diagonal blow-through conditions, and piston position, with respect to an engine position, for a given engine cylinder. As such, an engine controller may be configured to operate an engine boosting device, such as a turbocharger, to drive a boosted air flow through the engine cylinders while operating the engine with a positive intake to exhaust overlap. The engine controller may utilize a map, such as map 800, to identify the positive overlap period.

As such, an engine may be operated in a four-valve blow-through mode to provide more torque at low speed, reduce occurrence of knock by decreasing in-cylinder temperatures, expedite heating of an exhaust catalyst during cold start conditions, and increase a turbine speed to a desired speed during cold start conditions. As discussed at FIGS. 4 and 6, the four-valve blow-through conditions may include one or more of a tip-in event, a turbine speed lower than a threshold at the time of the tip-in, a torque demand greater than a threshold torque demand and an engine speed less than a threshold engine speed, and an indication of knock. Four-valve blow-through conditions may further include a valve temperature of one or more valves in a cylinder head greater than a threshold temperature. For example, when a temperature of one or more valves in a cylinder head is greater than threshold and when blow-through is desired, engine may be operated in a four-valve blow-through mode instead of a two-valve blow-through to reduce degradation of the intake and exhaust valves due to excess heat.

Map 800 illustrates an engine position along X axis in crank angle degrees (CAD). Curve 802 depicts piston position (along the Y axis), with reference to their location from top dead center (TDC) and/or bottom dead center (BDC), and further with reference to their location within the four strokes (intake, compression, power, and exhaust) of an engine cycle. As indicated by sinusoidal curve 802, a piston gradually moves downward from TDC, bottoming out at BDC by the end of the power stroke. The piston then returns to the top, at TDC, by the end of the exhaust stroke. The piston, then again moves back down, towards BDC, during the intake stroke, returning to its original top position at TDC by the end of the compression stroke.

Curves 804 and 806 depict valve timings for scavenging exhaust valves E1 and E3 respectively (e.g., exhaust valves E1 and E3 at FIG. 3A), and curves 808 and 810 depict valve timings for scavenging intake valves I4 and I2 respectively (e.g., intake valves I2 and I4 at FIG. 3A) during engine operation in the four-valve blow-through mode. As illustrated, the exhaust valves may be opened just before the piston reaches BDC at the end of the power stroke. The exhaust valves may close as the piston completes the exhaust stroke, remaining open at least until a subsequent intake stroke has commenced. In the same way, the intake valves may be opened at or before the start of the intake stroke, and may remain open at least until the subsequent compression stroke has commenced.

As a result of timing differences between exhaust valve closing and intake valve opening, for a short duration 812, before the end of the exhaust stroke and after the commencement of the intake stroke, the intake and the exhaust valves may be open. That is, positive valve overlap may occur. In one example, the positive valve overlap may be a default cam position of the engine during an engine cold-start.

In this way, valve timings, durations, and valve-lifts may be adjusted to provide the four-valve blow-through.

Taken together, in this way, during blow-through conditions engine may be operated in a two-valve blow-through mode to increase length of flow path, thereby increasing the amount of air trapped in the cylinder during the blow-through. As a result, due to increased cylinder air charge and reduced leaking of air into the exhaust, improved torque output, reduced exhaust catalyst temperature, reduced tendency for knock and improved fuel economy may be achieved. However, when expedited heating of catalyst is desired (e.g., during a cold start) four-valve blow-through may be used. Further, four-valve blow-through may be utilized instead of two-valve blow through when the temperature of one or more intake and/or valves is greater than a threshold degradation temperature to reduce thermal load on the valves.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine including a four-valve cylinder, comprising:
    during a first mode, flowing more blow-through from an intake manifold to an exhaust manifold through a first intake valve and a first exhaust valve, positioned diagonally across from the first intake valve, having positive valve overlap, than through a second intake valve and a second exhaust valve of the cylinder, positioned diagonally across from the second intake valve, having negative valve overlap, the first exhaust valve having different valve timing than the second exhaust valve.

2. The method of claim 1, further comprising during a second mode, flowing blow-through through the first intake valve, the second intake valve, the first exhaust valve, and the second exhaust valve, the first and second intake valves having positive valve overlap with the first and second exhaust valves, respectively.

3. The method of claim 2, wherein during the first mode, a duration of first intake valve lift is greater than a duration of second intake valve lift, and a duration of first exhaust valve lift is greater than a duration of second exhaust valve lift.

4. The method of claim 2, wherein during the second mode, a duration of first intake valve lift is equal to a duration of second intake valve lift, and a duration of first exhaust valve lift is equal to a duration of second exhaust valve lift.

5. The method of claim 2, further comprising, during the first mode, not providing positive overlap between the second intake valve and the second exhaust valve when providing positive overlap between the first intake valve and the second intake valve greater than a threshold positive overlap.

6. The method of claim 2, wherein flowing the blow-through is in response to one or more of a tip-in greater than a threshold tip-in, a detection of knock, an engine speed less than a threshold speed, and a torque demand greater than a threshold demand.

7. The method of claim 4, further comprising adjusting an in-cylinder air-to-fuel ratio to maintain a stoichiometric exhaust air-to-fuel ratio during the first mode and the second mode.

8. The method of claim 2, wherein flowing the blow-through during the first mode is further in response to a first exhaust valve temperature less than a threshold temperature.

9. The method of claim 2, further comprising flowing the blow-through past a mask at the first intake valve or the first exhaust valve or both, the mask blocking a shortest distance between the first intake valve and the first exhaust valve.

10. A method for an engine comprising:
    during a first combustion cycle, providing cylinder blow-through via a first set of diagonal valves with positive valve overlap greater than a threshold and not through a second set of diagonal valves without positive valve overlap, exhaust valves of the sets having different timing, and
    during a second combustion cycle, providing cylinder blow-through via all four valves with both sets having positive overlap greater than the threshold.

11. The method of claim 10, wherein the first combustion cycle includes one or more of a tip-in greater than a threshold tip-in, a detection of knock, an engine speed less than a threshold speed, and a torque demand greater than a threshold demand, and a temperature of each of the first set of diagonal valves less than a threshold temperature, and wherein the second combustion cycle includes one or more of a catalyst temperature less than a light-off temperature, a tip-in greater than a threshold tip-in, a detection of knock, an engine speed less than a threshold speed, and a torque demand greater than a threshold demand, and a temperature of one or more of the four valves greater than the threshold temperature.

12. The method of claim 11, wherein during the first combustion cycle, a first exhaust valve opening timing of the first set of diagonal valves coincides with a second exhaust valve opening timing of the second set of diagonal valves, and a first exhaust valve closing timing of the first set of diagonal valves is retarded from a second exhaust valve closing timing of the second set of diagonal valves.

13. The method of claim 12, wherein during the first combustion cycle, a first intake valve opening timing of the first set of diagonal valves is advanced from a second intake valve opening timing of the second set of diagonal valves, and a first intake valve closing timing of the first set of diagonal valves coincides with a second intake valve closing timing of the second set of diagonal valves.

14. The method of claim 13, wherein during the second combustion cycle, the first exhaust valve opening timing coincides with the second exhaust valve opening timing, the first exhaust valve closing timing coincides with the second exhaust valve closing timing, the first intake valve opening timing coincides with the second intake valve opening timing, and the first intake valve closing timing coincides with the second intake valve closing timing.

15. The method of claim 10, further comprising passing blow-through past a partial mask of one or more of the four valves during the second combustion cycle.

16. The method of claim 10, further comprising providing a partial mask to one or more of the first set of diagonal valves during the first combustion cycle.

17. The method of claim 14, further comprising during the second combustion cycle operating a cylinder with a more rich air-to-fuel ratio, and during the first combustion cycle operating the cylinder with a less rich air-to-fuel ratio to maintain an overall exhaust air-to-fuel ratio at stoichiometry.

* * * * *